US011959608B2

(12) United States Patent
Mozaffari-Afshar et al.

(10) Patent No.: US 11,959,608 B2
(45) Date of Patent: Apr. 16, 2024

(54) VEHICLE HEADLIGHT

(71) Applicant: Docter Optics SE, Neustadt an der Orla (DE)

(72) Inventors: Mohsen Mozaffari-Afshar, Neustadt an der Orla (DE); Sven Fröhlich, Neustadt an der Orla (DE); Siemen Kühl, Neustadt an der Orla (DE)

(73) Assignee: DOCTER OPTICS SE, Neustadt an der Orla (DE)

( * ) Notice: Subject to any disclaimer, the term of this patent is extended or adjusted under 35 U.S.C. 154(b) by 0 days.

(21) Appl. No.: 17/910,359

(22) PCT Filed: Mar. 12, 2021

(86) PCT No.: PCT/DE2021/100252
§ 371 (c)(1),
(2) Date: Sep. 9, 2022

(87) PCT Pub. No.: WO2021/185411
PCT Pub. Date: Sep. 23, 2021

(65) Prior Publication Data

US 2023/0139819 A1 May 4, 2023

(30) Foreign Application Priority Data

Mar. 15, 2020 (DE) ..................... 10 2020 107 075.6

(51) Int. Cl.
*F21S 41/255* (2018.01)
*F21S 41/26* (2018.01)
(Continued)

(52) U.S. Cl.
CPC ............ *F21S 41/255* (2018.01); *F21S 41/26* (2018.01); *F21S 41/265* (2018.01);
(Continued)

(58) Field of Classification Search
CPC ........ F21S 41/255; F21S 41/26; F21S 41/265; F21S 41/322
See application file for complete search history.

(56) References Cited

U.S. PATENT DOCUMENTS

| | | | | | |
|---|---|---|---|---|---|
| 8,899,802 | B2 * | 12/2014 | Fedosik | F21S 41/24 | |
| | | | | 362/326 | |
| 9,599,301 | B2 * | 3/2017 | Brendle | F21S 41/322 | |

(Continued)

FOREIGN PATENT DOCUMENTS

| | | |
|---|---|---|
| CN | 107131462 | 9/2017 |
| CN | 107685679 A1 | 2/2018 |

(Continued)

OTHER PUBLICATIONS

International Search Report and Written Opinion dated Jun. 15, 2021 For PCT/DE2021/100252.

(Continued)

*Primary Examiner* — Zheng Song
(74) *Attorney, Agent, or Firm* — DUANE MORRIS LLP

(57) ABSTRACT

The disclosure relates to a vehicle headlight (20), for example a motor vehicle headlight, wherein the vehicle headlight comprises a light source assembly (11) and a primary optics (200A), for example a press-molded primary optics, for example a one-piece primary optics (200A), wherein the primary optics (200A) comprises at least one light tunnel (208) and a wedge-shaped light conducting part (209) having at least one light exit surface (209A), for example optically effective light exit surface (209A), wherein the light tunnel (208) comprises at least one light entrance surface (201), for example an optically effective light entrance surface (201), into which light generated by means of the light source assembly (11) can be irradiated, wherein the light tunnel (208) transitions into the light conducting part (209) at a bend (207), and wherein the (Continued)

vehicle headlight comprises a secondary optics (200B) with an optically effective light exit surface (202) for imaging a light exit surface (209A) of the primary optics (200A) and/or of the light conducting part (209) or for imaging the bend (207).

23 Claims, 8 Drawing Sheets

(51) Int. Cl.

| | |
|---|---|
| ***F21S 41/265*** | (2018.01) |
| ***F21S 41/32*** | (2018.01) |
| *F21W 107/10* | (2018.01) |
| *F21Y 115/15* | (2016.01) |

(52) U.S. Cl.
CPC ........ *F21S 41/322* (2018.01); *F21W 2107/10* (2018.01); *F21Y 2115/15* (2016.08)

(56) References Cited

U.S. PATENT DOCUMENTS

| | | | | |
|---|---|---|---|---|
| 2006/0083013 | A1* | 4/2006 | Wanninger ........... | G02B 6/0028 362/509 |
| 2008/0080207 | A1* | 4/2008 | Specht .................. | F21S 41/151 362/581 |
| 2015/0330590 | A1* | 11/2015 | Wintzer ............. | G02B 19/0061 362/521 |
| 2019/0086050 | A1* | 3/2019 | Dikau ................... | F21S 41/322 |
| 2019/0323672 | A1* | 10/2019 | Nishimura ............ | F21S 41/322 |
| 2020/0292143 | A1* | 9/2020 | Spinger ................. | F21S 41/285 |
| 2022/0065416 | A1* | 3/2022 | Qiu ....................... | F21S 41/147 |
| 2022/0268413 | A1* | 8/2022 | Lee ....................... | F21S 41/322 |
| 2022/0373151 | A1 | 11/2022 | Zhang et al. | |

FOREIGN PATENT DOCUMENTS

| | | | |
|---|---|---|---|
| DE | 10 2008 003 706 | A1 | 7/2009 |
| DE | 10 2006 021 694 | B4 | 10/2012 |
| DE | 10 2017 204097 | | 9/2018 |
| DE | 11 2019 003 574 | T5 | 3/2021 |
| DE | 10 2020 119 939 | A1 | 2/2022 |
| EP | 3388734 | | 10/2018 |
| WO | 2014/114308 | | 7/2014 |
| WO | 2017/207079 | | 12/2017 |
| WO | 2019/179571 | A1 | 9/2019 |
| WO | 2020/064964 | A1 | 4/2020 |
| WO | 2020/250758 | A1 | 12/2020 |
| WO | 2021/008647 | A1 | 1/2021 |

OTHER PUBLICATIONS

M. Knöchelmann, et al., "Aktiver Scheinwerfer mit DMD-Technologie zur Erzeugung vollständiger Lichtverteilungen", VDI-Berichte Nr. 2323, 2018, pp. 61-78, DOI: 10.15488/3975.

Audi-Vorsprung durch Technik, https://web.archive.org/web/20150109234745/http://www.audi.de/content/de/brand/de/vorsprung_durch_technik/content/2013/08/Audi-A8-erstrahl, Jun. 28, 2022.

M. Bass, et al., "Handbook of Optics, Fundamentals, Techniques, & Design", Second edition, vol. 1, McGraw-Hill, Inc., 1995.

W. Huhn, "Anforderungen an eine adaptive Lichtverteilung fur Kraftfahrzeugscheinwerfer im Rahmen der ECE-Regelungen", Herbert Utz Verlag, 1999.

Franz-Josef Kalze und Dr. David Brunne, "LED im Fahrzeug: Die Rolle der Matrixscheinwerfer und was sie leisten", https://www.next-mobility.de/led-im-fahrzeug-die-rolle-der-matrixscheinwerfer-und-was-sie-leisten-a-756004/, Jun. 28, 2022.

Matrix-LED- und Laserlicht bietet viele Vorteile, https://www.all-electronics.de/automotive-transportation/matrix-led-und-laserlicht-bietet-viele-vorteile.html, Jun. 28, 2022.

International Preliminary Report on Patentability dated Sep. 20, 2022 for Corresponding PCT Application No. PCT/DE2021/100252.

* cited by examiner

VEHICLE HEADLIGHT

FIELD OF THE DISCLOSURE

The present disclosure relates to a headlight lens for a vehicle headlight, for example for a motor vehicle headlight, the headlight lens having a one-piece body made of a transparent material with at least one light entrance surface and with at least one optically effective light exit surface. The disclosure also relates to a corresponding vehicle headlight and a corresponding primary optics.

BACKGROUND

WO 2012/072188 A1 discloses a headlight lens for a motor vehicle headlight, the headlight lens having a body made of a transparent material with at least one (for example optically effective) light entrance surface and with at least one optically effective light exit surface, and the body comprising a light tunnel which transitions with a bend into a light conducting part for imaging the bend as a bright dark boundary.

SUMMARY

The present disclosure concerns a vehicle headlight, for example a motor vehicle headlight, wherein the vehicle headlight comprises a light source assembly and a primary optics, for example a press-molded primary optics, for example a one-piece primary optics, wherein the primary optics comprises at least one light tunnel and a wedge-shaped light conducting part, for example a wedge-shaped light conducting part tapering in the course from top to bottom, with at least one, for example optically effective, light exit surface, wherein the light tunnel comprises at least one, for example optically effective, light entrance surface into which light generated by means of the light source assembly can be irradiated, the light tunnel transitions with a bend into the light conducting part, and the vehicle headlight comprising a secondary optics having an optically effective light exit surface for imaging a light exit surface of the primary optics and/or of the light conducting part or for imaging the bend.

DETAILED DESCRIPTION

Figure 1:
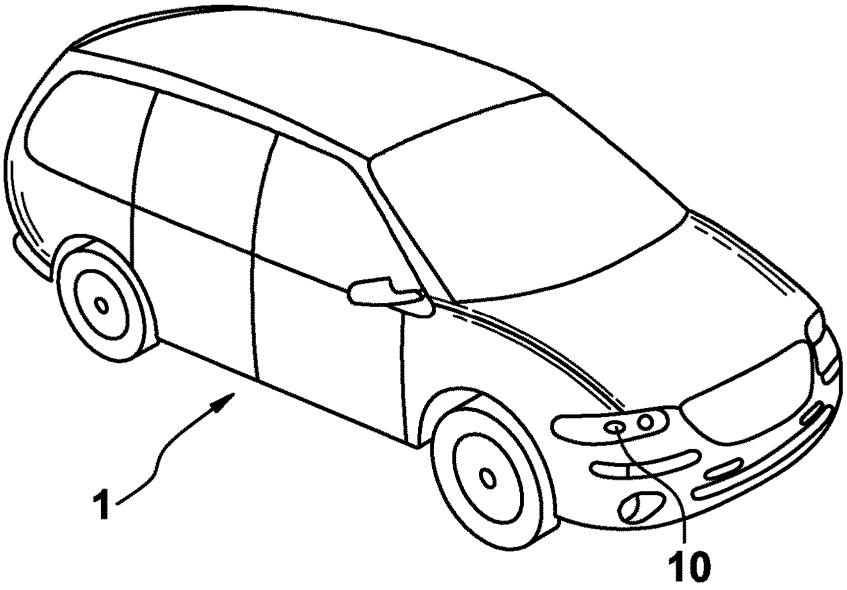
FIG. 1 shows an embodiment of a motor vehicle.

The present disclosure concerns a vehicle headlight, for example a motor vehicle headlight, wherein the vehicle headlight comprises a light source assembly and a primary optics, for example a press-molded primary optics, for example a one-piece primary optics, wherein the primary optics comprises at least one light tunnel and a wedge-shaped light conducting part, for example a wedge-shaped light conducting part tapering in the course from top to bottom, with at least one, for example optically effective, light exit surface, wherein the light tunnel comprises at least one, for example optically effective, light entrance surface into which light generated by means of the light source assembly can be irradiated, the light tunnel transitions with a bend into the light conducting part, and the vehicle headlight comprising a secondary optics having an optically effective light exit surface for imaging a light exit surface of the primary optics and/or of the light conducting part or for imaging the bend. Wedge-shaped in the sense of the present disclosure means for example or by way of example the use of a blunt wedge, i.e. a wedge without a tip as illustrated for example in FIG. 13. The wedge angle is also referred to hereinafter as a bevel. An image in the sense of the present disclosure is for example also a distorting or distorted image.

It can be provided that the secondary optics comprises a, for example optically effective, for example essentially, plane light entrance surface, which is tilted with respect to the light exit surface of the primary optics by a tilt angle.

In an embodiment, the light exit surface of the primary optics is tilted with respect to an imaginary plane by a tilt angle, the imaginary plane having a normal in a z-direction, the z-direction being along the direction of one or the optical axis of the primary optics, the secondary optics, the light exit surface of the secondary optics, and/or a central segment of the light exit surface of the secondary optics.

In an embodiment, the wedge angle of the wedge-shaped light conducting part and the tilt angle are, for example essentially, equal.

The present disclosure concerns also a vehicle headlight, for example a motor vehicle headlight, wherein the vehicle headlight comprises a light source assembly and a primary optics, for example a press-molded primary optics, for example a one-piece primary optics, wherein the primary optics comprises at least one light tunnel and one, for example optically effective, light exit surface, wherein the light tunnel comprises at least one, for example optically effective, light entrance surface, into which light generated by means of the light source assembly can be irradiated, the vehicle headlight comprising a secondary optics having an optically effective light exit surface for imaging the light exit surface of the primary optics, and the secondary optics comprising an, for example optically effective, for example essentially, plane light entrance surface which is tilted by a tilt angle with respect to the light exit surface of the primary optics.

In an embodiment, the tilt angle extends in an imaginary plane spanned by a y-direction and a z-direction, wherein the y-direction extends, for example essentially, vertically when the vehicle headlight is used as intended, and wherein the z-direction extends along the direction of one or the optical axis of the primary optics, the secondary optics, the light exit surface of the secondary optics and/or a central segment of the light exit surface of the secondary optics. A y-direction in the sense of the present disclosure is for example a vertical direction or a vertical orientation. An x-direction in the sense of this disclosure is for example a horizontal direction or orientation. A y-direction within the meaning of this disclosure is for example orthogonal to the x-direction. Both an x-direction and a y-direction are for example orthogonal to a z-direction within the meaning of the present disclosure, wherein the z-direction is in the direction or orientation of one or the optical axis of the primary optics, the secondary optics, the light exit surface of the secondary optics, and/or a central segment of the light exit surface of the secondary optics.

The present disclosure concerns also a vehicle headlight, for example a motor vehicle headlight, the vehicle headlight comprising a light source assembly and a primary optics, for example a press-molded primary optics, for example a one-piece primary optics, the primary optics comprising at least one light tunnel and one, for example optically effective, light exit surface, the light tunnel comprising at least one, for example optically effective, light entrance surface, into which light generated by means of the light source assembly can be irradiated, the vehicle headlight comprising a secondary optics having an optically effective light exit surface for imaging the light exit surface of the primary optics, and the light exit surface of the primary optics being tilted by a tilt angle with respect to an imaginary plane, the imaginary plane having a normal in a z-direction, the z-direction being in the direction or orientation of one or the optical axis of the primary optics, the secondary optics, the light exit surface of the secondary optics and/or a central segment of the light exit surface of the secondary optics.

In an embodiment, at least a first part (starting from the or a light entrance surface of the light tunnel) of the surface bounding the light tunnel, for example upwards, is part of at least a first ellipsoid, the semi-axis of which in the (horizontal) x-direction orthogonal to the optical axis of the light tunnel or to the extension of the light tunnel in the longitudinal direction or in the z-direction is, for example by at least 1.9 times, for example by at least three times, for example not more than twenty times, longer than its semi-axis in the (vertical) y-direction, the y-direction being/running, for example essentially, orthogonally to the x-direction.

In an embodiment, at least a second part (starting from the or a light entrance surface of the light tunnel) of the surface bounding the light tunnel, for example upwards, is part of at least a second ellipsoid whose semi-axis ratio differs from the semi-axis ratio of the first ellipsoid. A semi-axis ratio in the sense of the present disclosure is for example the ratio of the largest semi-axis of an ellipsoid to its smallest semi-axis. For example, it is provided that the largest semi-axis is orthogonal to (aligned with) the semi-axis considered to be the smallest semi-axis.

In an embodiment, at least a second part (starting from the or a light entrance surface of the light tunnel) of the surface bounding the light tunnel, for example upwards, is part of a, for example essentially, rotationally symmetrical ellipsoid.

In an embodiment, the primary optics, for example essentially, comprises inorganic glass.

In an embodiment, the secondary optics are made, for example substantially, of plastic.

In a further embodiment, the wedge angle and/or the tilt angle is more than 2°. In a further embodiment, the wedge angle and/or the tilt angle is not more than 7°. In a further embodiment, the wedge angle and/or the tilt angle is between 5° and 6°.

The present disclosure concerns also a headlight lens for a vehicle headlight, for example for a motor vehicle headlight, having for example one or more of the above-mentioned features, the headlight lens comprising a body made of glass, for example a press-molded body, for example a one-piece body, the, for example one-piece, body comprising at least one light tunnel and a light conducting part with at least one optically effective light exit surface, the light tunnel comprising at least one, for example optically effective, light entrance surface and transitions in the light conducting part with a bend for imaging the bend as a bright dark boundary by means of light coupled into or radiated into the light entrance surface, wherein at least a first part (starting from the or a light entrance surface of the light tunnel) of the surface bounding the light tunnel, for example upwards, is part of at least a first ellipsoid, the semi-axis of which in the (horizontal) x-direction orthogonal to the optical axis of the light tunnel or to the extension of the light tunnel in the longitudinal direction or in the z-direction is, for example by at least 1.9 times, for example by at least three times, for example not more than twenty times, longer than its semi-axis in the (perpendicular) y-direction, the y-direction being/running, for example essentially, orthogonally to the x-direction, and a second part (starting from the or a light entrance surface of the light tunnel) of the surface bounding the light tunnel, for example upwards, being part of at least second ellipsoid, the semi-axis ratio of which differs from the semi-axis ratio of the first ellipsoid.

In an embodiment, the second ellipsoid is a, for example essentially, rotationally symmetric ellipsoid.

The present disclosure concerns also a primary optics, for example a press-molded primary optics, for example one-piece primary optics, having for example one or more of the above-mentioned features, the primary optics comprising at least one light tunnel and a wedge-shaped light conducting part, for example tapering in the course from top to bottom, with at least one, for example optically effective, light exit surface, the light tunnel comprising at least one, for example optically effective, light entrance surface, the light tunnel transitions with a bend into the light conducting part, wherein at least a first part (starting from the or a light entrance surface of the light tunnel) of the surface bounding the light tunnel, for example upwards, being part of at least a first ellipsoid, the semi-axis of which in the (horizontal) x-direction orthogonal to the optical axis of the light tunnel or to the extension of the light tunnel in the longitudinal direction or in the z-direction is, for example at least 1.9 times, for example at least three times, for example not more than twenty times, longer than its semi-axis in the (vertical) y-direction, wherein the y-direction, for example essentially, is/running orthogonal to the x-direction, and wherein a second part (starting from the or a light entrance surface of the light tunnel) of the surface bounding the light tunnel, for example upwards, is part of at least second ellipsoid, the semi-axis ratio of which differs from the semi-axis ratio of the first ellipsoid.

In an embodiment, the second ellipsoid is a, for example essentially, rotationally symmetric ellipsoid.

The present disclosure concerns also a headlight lens for a vehicle headlight, for example for a motor vehicle headlight, wherein the headlight lens comprises a body made of glass, for example a press-molded body, for example a one-piece body, wherein the, for example one-piece, body comprises at least one light tunnel and a light conducting part with at least one optically effective light exit surface, wherein the light tunnel comprises at least one light entrance surface, for example an optically effective light entrance surface, and transitions with a bend into the light conducting part for imaging the bend as a bright dark boundary by means of light coupled or irradiated into the light entrance surface, wherein a first part of the surface bounding the light tunnel, for example upwards, is part of an ellipsoid whose semi-axis in the horizontal direction orthogonal to the optical axis of the light tunnel or to the extension of the light tunnel in the longitudinal direction is, for example by at least 1.9 times, for example by at least three times, for example not more than twenty times, longer than its semi-axis in the vertical direction, or part of an ellipsoid $$E(x,z;y)=E_{a_1,b_1}(z;y)\times E_{a_2,b_2}(x;y)$$

where $$E_{a_1,b_1}(z;y)$$

and $$E_{a_2,b_2}(x;y)$$

are two crossed ellipses, where z is a coordinate in the direction of the optical axis of the light tunnel and/or in the longitudinal direction of the light tunnel, where y is a coordinate in the vertical direction, where x is a coordinate orthogonal to the y direction and orthogonal to the z direction, where $$E_{a_1,b_1}(z;y):\ \frac{z^2}{a_1^2}+\frac{y^2}{b_1^2}=1$$

$$E_{a_2,b_2}(x;y):\ \frac{x^2}{a_2^2}+\frac{y^2}{b_2^2}=1$$

where applies:

$1.9\cdot b_1\leq a_2$ and/or $3\cdot b_1\leq a_2$ and/or $0<a_1/a_2\leq 1.5$ or $0\leq a_1/a_2\leq 1.5$ and/or $a_2\leq 20\cdot b_1$ and/or $a_2\leq 50\cdot b_1$, wherein at least a second part of the surface bounding the light tunnel, for example upwards, is part of a, for example essentially, rotationally symmetrical ellipsoid. Rotationally symmetrical in the sense of the present disclosure is an ellipsoid for example if $b_1$ does not deviate from a 2 by more than 9%, for example by more than 5%. The quotient $a_2/b_1$ is an embodiment example of a semi-axis ratio in the sense of the present disclosure.

The present disclosure concerns a vehicle headlight, for example a motor vehicle headlight, wherein the vehicle headlight comprises primary optics with an, for example press-molded, for example one-piece, body of glass, wherein the, for example one-piece, body comprises at least one light tunnel and a wedge-shaped light conducting part with at least one, for example optically effective, light exit surface, wherein the light tunnel comprises at least one, for example optically effective, light entrance surface and transitions with a bend into the light conducting part, the vehicle headlight comprising a secondary optics with an optically effective light exit surface for imaging an exit surface of the light conducting part or of the bend.

The inclination (wedge angle) of the wedge is for example more than 2°, not more than 7°, for example the inclination (wedge angle) of the wedge is between 5° and 6°.

In an embodiment, it is provided that at least a first part of the surface bounding the light tunnel, for example upwards, is at least part of an ellipsoid whose semi-axis in the horizontal direction orthogonal to the optical axis of the light tunnel or to the extension of the light tunnel in the longitudinal direction is, for example by at least 1.9 times, for example by at least three times, for example not more than twenty times, longer than its semi-axis in the vertical direction, or part of an ellipsoid $$E(x,z;y)=E_{a_1,b_1}(z;y)\times E_{a_2,b_2}(x;y)$$

where $$E_{a_1,b_1}(z;y)$$

and $$E_{a_2,b_2}(x;y)$$

are two crossed ellipses, where z is a coordinate in the direction of the optical axis of the light tunnel and/or in the longitudinal direction of the light tunnel, where y is a coordinate in the vertical direction, where x is a coordinate orthogonal to the y direction and orthogonal to the z direction, where $$E_{a_1,b_1}(z;y):\ \frac{z^2}{a_1^2}+\frac{y^2}{b_1^2}=1$$

$$E_{a_2,b_2}(x;y):\ \frac{x^2}{a_2^2}+\frac{y^2}{b_2^2}=1$$

where applies:

$1.9\cdot b_1\leq a_2$ and/or $3\cdot b_1\leq a_2$ and/or $0<a_1/a_2\leq 1.5$ or $0\leq a_1/a_2\leq 1.5$ and/or $a_2<20\cdot b_1$ and/or $a_2\leq 50\cdot b_1$ In a further embodiment, it is provided that at least a second part of the surface bounding the light tunnel, for example upwards, is part of a, for example essentially, rotationally symmetrical ellipsoid. Rotationally symmetrical in the sense of the present disclosure is an ellipsoid for example if b 1 does not deviate from a 2 by more than 9%, for example by more than 5%.

In an embodiment, one or the right side surface of the light tunnel and/or one or the left side surface of the light tunnel is (at least partially) concavely curved.

In a further embodiment, one or the right and/or one or the left side surface of the light tunnel is (at least partially) curved according to a Bezier curve. In a further embodiment of the disclosure the following applies:

$0.3 \cdot d_1 \leq s_1 \leq 0.7 \cdot d_1$ and/or $0.4 \cdot d_2 \leq s_2 \leq 1.5 \cdot d_2$ and/or $1.5 \leq d_1/d_2 \leq 10$ and/or $0.3 \leq g \leq 0.7$, when the starting point of the Bezier curve has the coordinates 0,0, the end point of the Bezier curve has the coordinates $d_1$, $d_2$, the or a control point of the Bezier curve has the coordinates $s_1$, $s_2$, and/or the or a control point of the Bezier curve has the weighting g.

In a further embodiment, the light tunnel is funnel-shaped, tapering toward the light entrance surface. In a further embodiment, the right and left side surfaces of the light tunnel form a portion of a funnel that tapers toward the light entrance surface. In one embodiment, the left side surface of the light tunnel is not symmetrical to the right side surface of the light tunnel. In one embodiment, the left side surface of the light tunnel is inclined with respect to the optical axis of the light tunnel. In one embodiment, the right side surface of the light tunnel is inclined with respect to the optical axis of the light tunnel.

An optically effective light entrance surface or an optically effective light exit surface is an optically effective surface of the one-piece body. An optically effective surface within the meaning of the disclosure is, for example, a surface of the transparent body on which light refraction occurs when the headlight lens is used as intended. An optically effective surface in the sense of the disclosure is for example a surface on which the direction of light passing through this surface is (specifically) changed when the headlight lens is used as intended.

For the purposes of the disclosure, glass is for example inorganic glass. For the purposes of the disclosure, glass or inorganic glass is for example silicate glass. Glass or inorganic glass in the sense of the disclosure is for example glass as described in WO 2009 109209 A1. Glass or inorganic glass within the meaning of the disclosure comprises for example 0.2 to 2 wt.-% $Al_2O_3$, 0.1 to 1 wt.-% $Li_2O$, 0.3, for example 0.4, to 1.5 wt.-% $Sb_2O_3$, 60 to 75 wt.-% $SiO_2$, 3 to 12 wt.-% $Na_2O$, 3 to 12 wt.-% $K_2O$ and 3 to 12 wt.-% CaO.

For the purposes of the disclosure, press-molding means for example pressing an optically effective surface in such a way that subsequent finishing of the contour of this optically effective surface can be omitted or is omitted or is not provided. It is thus intended for example that a press-molded surface is not ground after the press-molding.

A light tunnel in the sense of the disclosure is characterized for example by the fact that substantially total reflection takes place at its lateral (for example top, bottom, right and/or left) surfaces, so that light entering through the light entrance surface is guided through the tunnel as a light guide. A light tunnel in the sense of the disclosure is for example a light guide. For example, it is provided that total reflection occurs at the longitudinal surfaces of the light tunnel. For example, it is provided that the longitudinal surfaces of the light tunnel are provided for total reflection. For example, it is provided that total reflection occurs at the surfaces of the light tunnel oriented essentially in the direction of the optical axis of the light tunnel. For example, it is provided that the surfaces of the light tunnel oriented substantially in the direction of the optical axis of the light tunnel are provided for total reflection. In an embodiment, it is provided that the light tunnel, for example in the region of the bend, has no reflective coating.

A bend in the sense of the disclosure is for example a curved transition. A bend in the sense of the disclosure is for example a transition curved with a radius of curvature of not less than 50 nm. For example, it is provided that the surface of the headlight lens in the bend has no discontinuity but a curvature. For example, it is provided that the surface of the headlight lens in the bend has a curvature, for example with a radius of curvature of the curvature in the bend of not less than 50 nm. In an embodiment, the radius of curvature is not greater than 5 mm. In an embodiment, the radius of curvature is not greater than 0.25 mm, for example not greater than 0.15 mm, for example not greater than 0.1 mm. In a further embodiment, the radius of curvature of the curvature in the bend is at least 0.05 mm. For example, it is provided that the surface of the headlight lens in the bend region is press-molded.

In a further embodiment, the light tunnel is funnel-shaped, tapering toward the light entrance surface. In a further embodiment, the right and left side surfaces of the light tunnel form a portion of a funnel that tapers toward the light entrance surface. In one embodiment, the left side surface of the light tunnel is not symmetrical to the right side surface of the light tunnel. In one embodiment, the left side surface of the light tunnel is inclined with respect to the optical axis of the light tunnel. In one embodiment, the right side surface of the light tunnel is inclined with respect to the optical axis of the light tunnel.

In an embodiment, the light exit surface is segmented. In a further embodiment, the light emitting surface comprises at least two segments. In a further embodiment, the light exit surface comprises at least three segments, for example a central segment surrounded by two edge segments.

A segment of a light exit surface in the sense of the disclosure is for example separated from another or further segment of the light exit surface by means of an indentation or a bend. A segment of a light exit surface in the sense of the disclosure is for example a surface according to a (mathematical or geometrical) function which differs from the (mathematical or geometrical) function of an adjacent segment. A segment in the sense of the disclosure is for example an optically effective surface according to a (mathematical or geometrical) function which differs from the (mathematical or geometrical) function of an adjacent segment.

In a further embodiment, it is provided that at least a part of the surface bounding the light tunnel, for example upwards, is part of an ellipsoid whose semi-axis in the horizontal direction orthogonal to the optical axis of the light tunnel or to the extension of the light tunnel in the longitudinal direction is, for example at least 1.9 times, for example at least three times, for example not more than twenty times, longer than its semi-axis in the vertical direction.

A light source assembly within the meaning of this disclosure is for example an arrangement of several LEDs, for example an arrangement of LEDs that are separated from each other. For example, it can be provided that a light entrance surface of a light tunnel is segmented and at least one LED or one OLED is assigned to different segments. A light source assembly within the meaning of the present disclosure comprises, for example, at least one LED or an arrangement of LEDs. In an embodiment, the light source comprises at least one OLED or an array of OLEDs. The light source may also be, for example, a planar light array. The light source may also comprise light element chips as disclosed in DE 103 15 131 A1. A light source may also be a laser. A usable laser is disclosed in ISAL 2011 Proceedings, page 271 ff.

For example, it is envisaged that the bend, which is imaged as the bright dark boundary, is located in the lower region of the light tunnel.

In a further embodiment, the distance of the light source from the center of the light exit surface in orientation of the optical axis of the light tunnel and/or the light conducting part is not more than 8 cm. In a further embodiment, the length of the vehicle headlight (limited to light source and headlight lens) in orientation of the optical axis of the light tunnel and/or the light transmitting part is not more than 8 cm.

One or more additional light sources may be provided, the light from which is coupled or irradiated into the light conducting part and/or part of the light tunnel for implementing signlight, high beam and/or cornering light. When coupling such additional light into the light tunnel, it is particularly intended that this takes place in the half of the light tunnel that is closer to the light conducting part and/or in which the light entrance surface is not provided.

One or more additional light sources may be provided, the light from which is coupled or irradiated into the light conducting part and/or part of the light tunnel for implementing signlight, high beam and/or cornering light. When coupling such additional light into the light tunnel, it is provided for example that this is done in the half of the light tunnel that is closer to the light conducting part and/or in which the light entrance surface is not provided. Additional light source arrangements may be provided for example, as described or claimed in WO 2012/072192 A1. Additional light source arrangements are thereby described for example in FIGS. 10, 14, 15, 18, 19, 20 and 21 of WO 2012/072192 A1. The headlight lens according to the disclosure can for example also be used in arrays with mutually inclined optical axes, as is disclosed (or claimed), for example, in WO 2012/072193 A2, for example in FIG. 24 of WO 2012/072193 A2. Furthermore or alternatively, it may be envisaged that the headlight lens according to the disclosure is used in vehicle configurations as disclosed or claimed in WO 2012/072191 A2.

In a further embodiment, the light source and the (first) light entrance surface are configured and arranged relative to each other such that light from the light source enters the light entrance surface with a luminous flux density of at least 75 lm/mm.[2]

The aforementioned headlight lenses can be manufactured by means of a process described in WO 2012/072188 A1 or in WO 2021 008657 A1.

It may be provided that a light entrance surface in the sense of the disclosure and/or a light exit surface in the sense of the disclosure has a light scattering structure. A light scattering structure in the sense of the disclosure may be, for example, a structure as disclosed in DE 10 2005 009 556 A1 and EP 1 514 148 A1 or EP 1 514 148 B1. It may be provided that a light tunnel is coated in the sense of the disclosure. It may be provided that a light tunnel in the sense of the disclosure is coated with a reflective layer. It may be provided that a light tunnel in the sense of the disclosure is mirrored.

A side surface of a light tunnel within the meaning of the disclosure is for example a surface laterally bounding the light tunnel.

Terms such as top, bottom, horizontal and vertical refer to intended use, i.e. these terms refer to the alignment in the installed state or in the installed state in a headlight or in the installed state in a motor vehicle.

The aforementioned task is also solved by a headlight lens, for example having one or more of the aforementioned features, or a primary optics, for example having one or more of the aforementioned features.

The present disclosure concerns further a motor vehicle with one of the aforementioned vehicle headlights.

Motor vehicle in the sense of the disclosure is for example a land vehicle which can be used individually in road traffic. Motor vehicles within the meaning of the disclosure are for example not limited to land vehicles with internal combustion engines.

Figure 2:
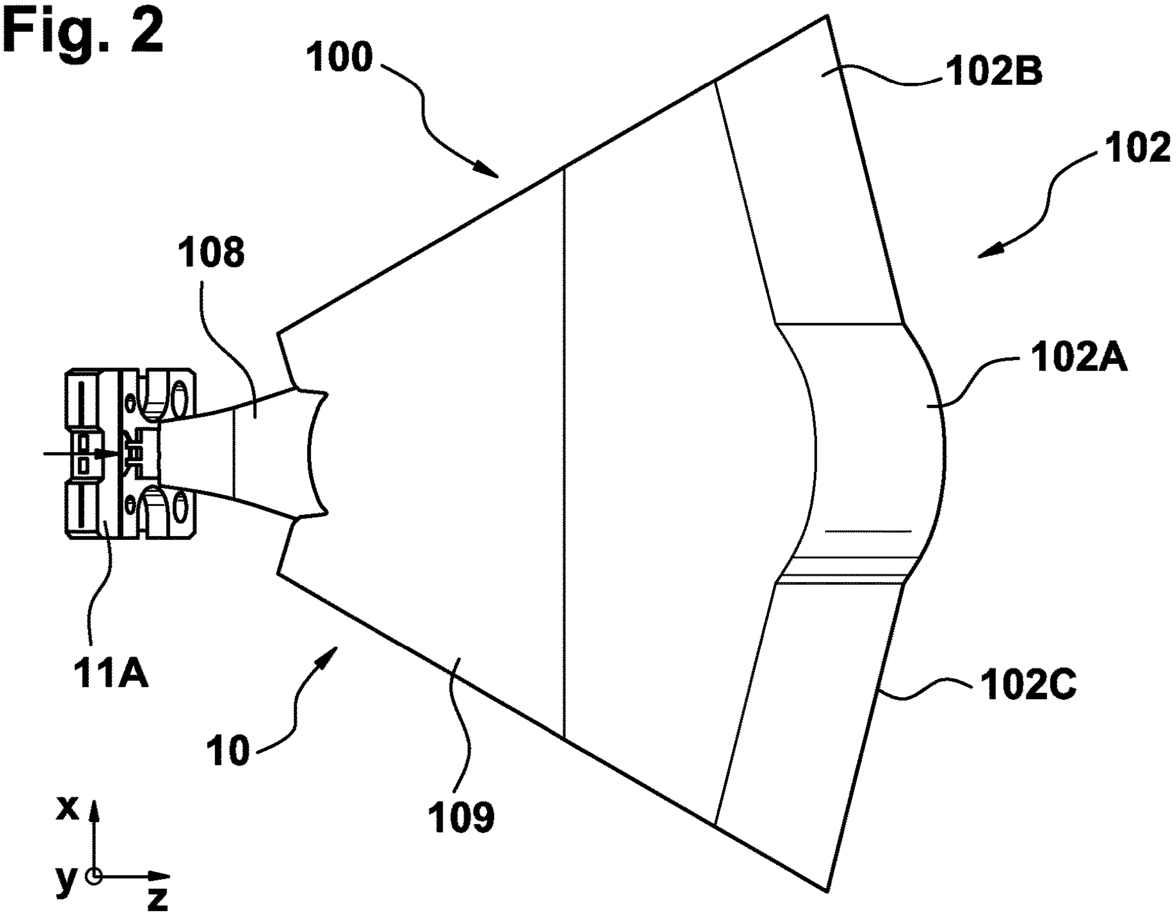
FIG. 2 shows an embodiment of a motor vehicle headlight for use in the motor vehicle according to FIG. 1 in a plan view.
Figure 3:
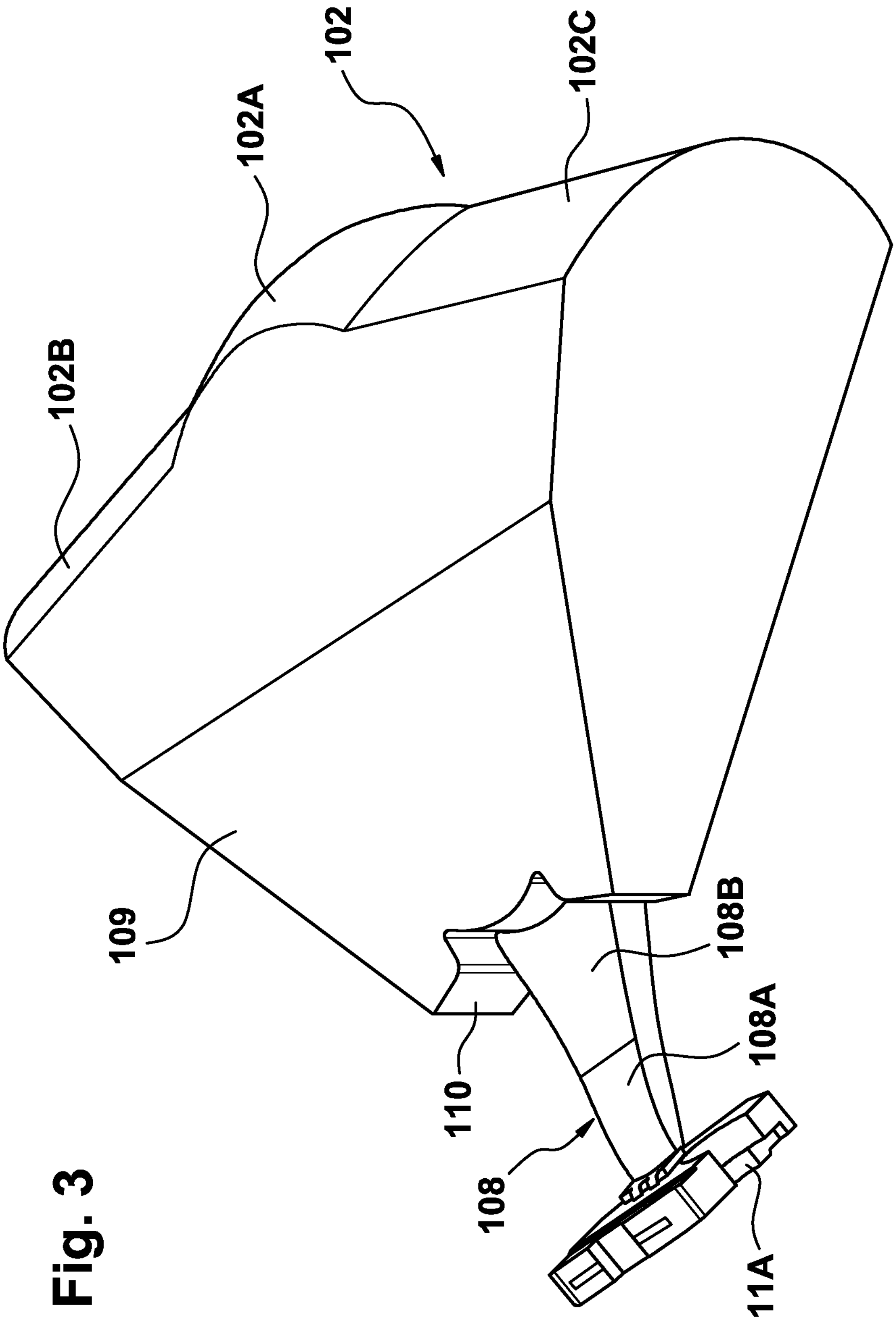
FIG. 3 shows the motor vehicle headlight according to FIG. 2 in a perspective side view.

FIG. 1 shows an embodiment of a motor vehicle 1 with a motor vehicle headlight 10. FIG. 2 shows the motor vehicle headlight 10 in a plan view with a headlight lens 100, but without housing, holders and power supply, wherein the headlight lens 100 is shown in FIG. 3 in a perspective side view, but also without housing, holders and power supply. The headlight lens 100 comprises a press-molded one-piece body made of inorganic glass, for example glass that 0.2 to 2 wt.-% $Al_2O_3$,
0.1 to 1 wt.-% $Li_2O$,
0.3, for example 0.4, to 1.5 wt.-% $Sb_2O_3$,
60 to 75 wt.-% $SiO_2$,
3 to 12 wt.-% $Na_2O$,
3 to 12 wt.-% $K_2O$ and
3 to 12 wt.-% CaO, comprises.

Figure 5:
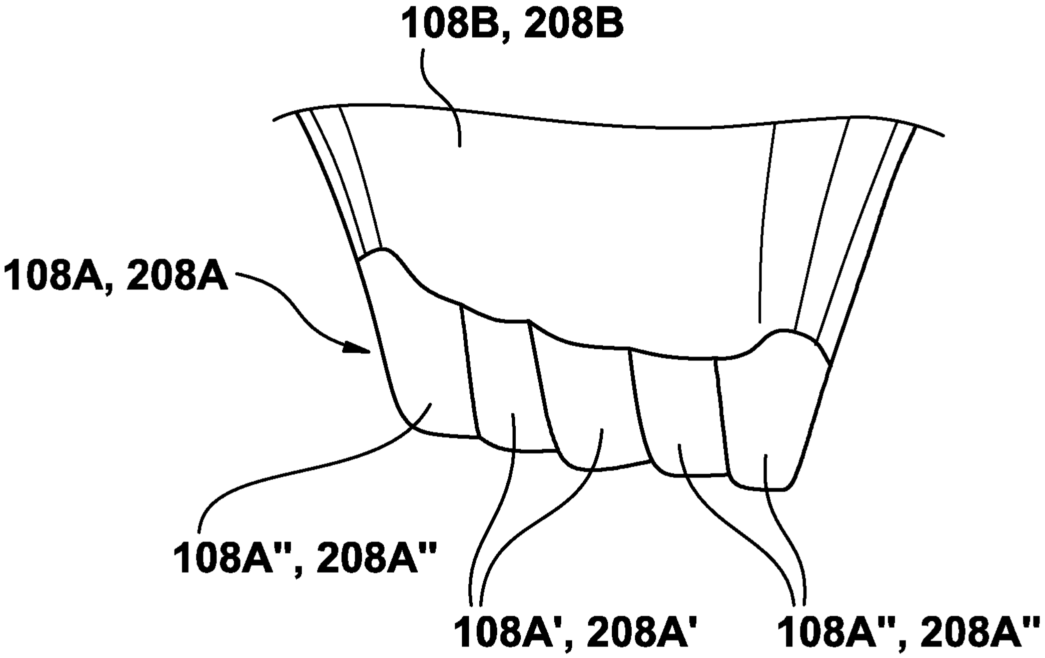
FIG. 5 shows a sectional view of the light tunnel of the headlight lens according to FIG. 3.
Figure 6:
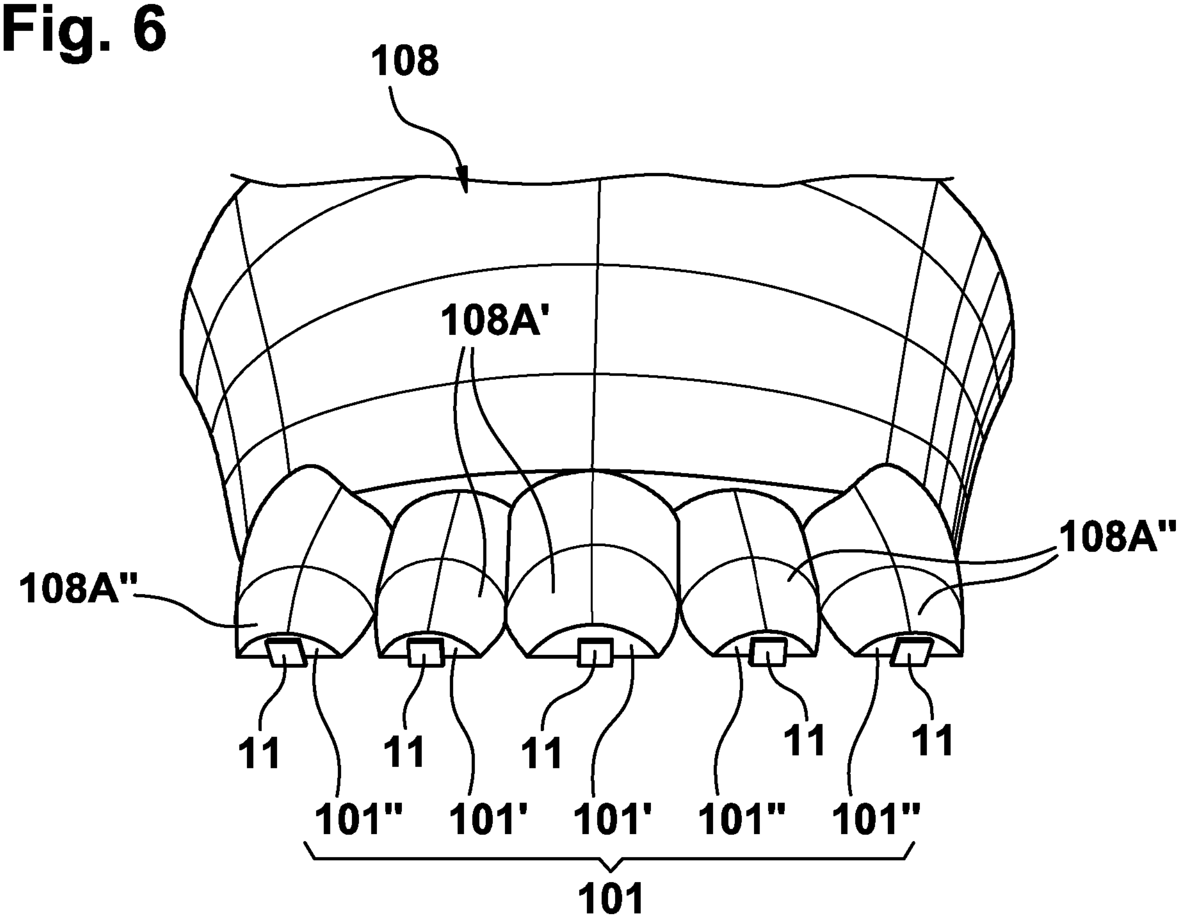
FIG. 6 shows another sectional view of the light tunnel of the headlight lens according to FIG. 3.

The press-molded one-piece body comprises a light tunnel 108 shown in FIG. 5 and in FIG. 6 in a detailed cutaway view, the light tunnel 108 having on one side a segmented light entrance surface 101, the segments or light entrance segments of which are designated 101' and 101" in FIG. 6. Accordingly, as shown in FIG. 5 and FIG. 6, the front part 108A of the light tunnel 108 is segmented on its upwardly bounded surface, with the upper segment surfaces following either flattened ellipsoids (segment 108X) or rotationally symmetrical ellipsoids (segment 108A).

Figure 4:
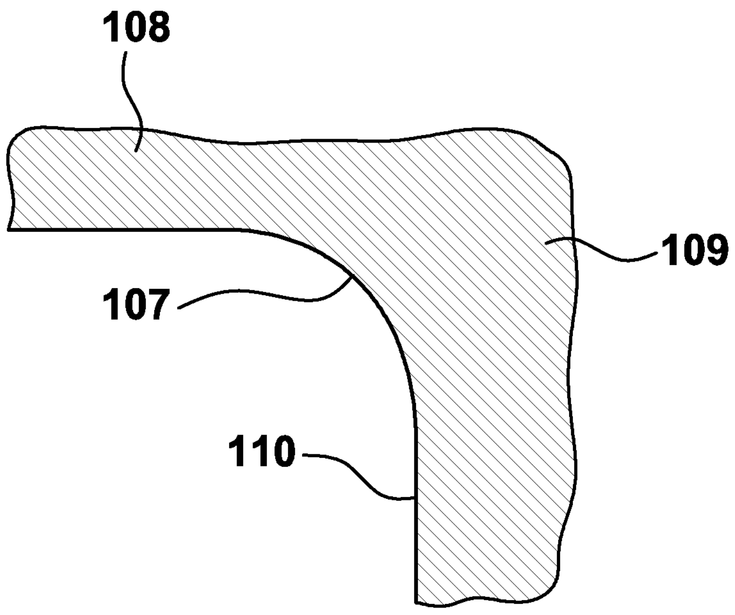
FIG. 4 shows an enlarged sectional cross-section of a bend for the transition of a light tunnel into a light conducting part of a headlight lens according to FIG. 3.
Figure 8:
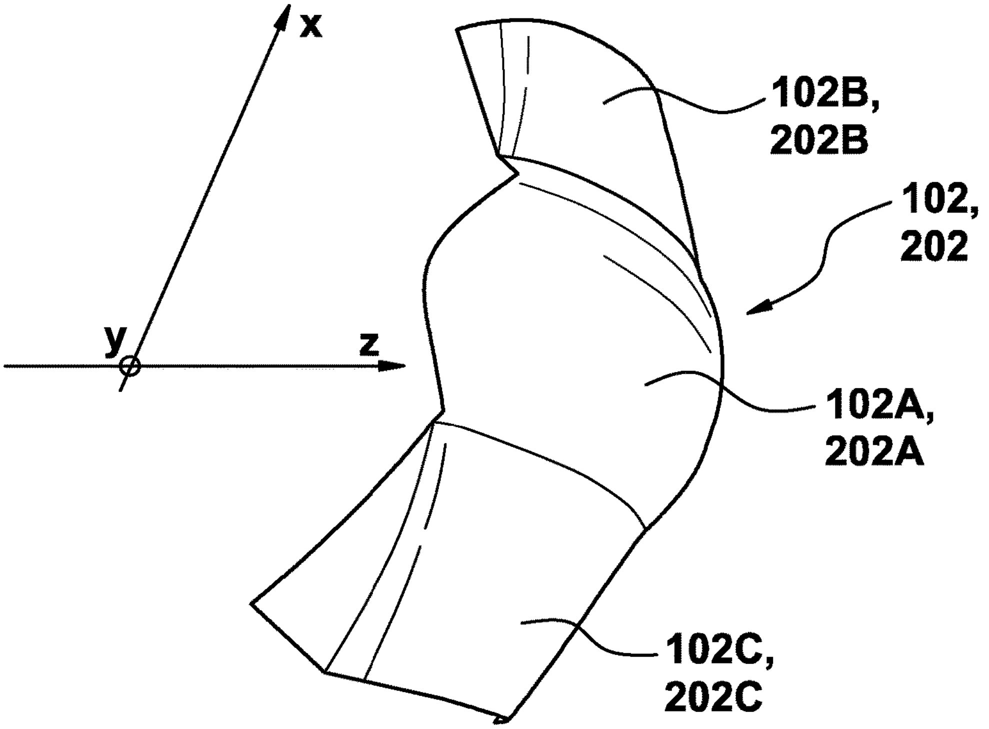
FIG. 8 shows the light exit surface of the headlight lens according to FIG. 3 in a perspective view.
Figure 9:
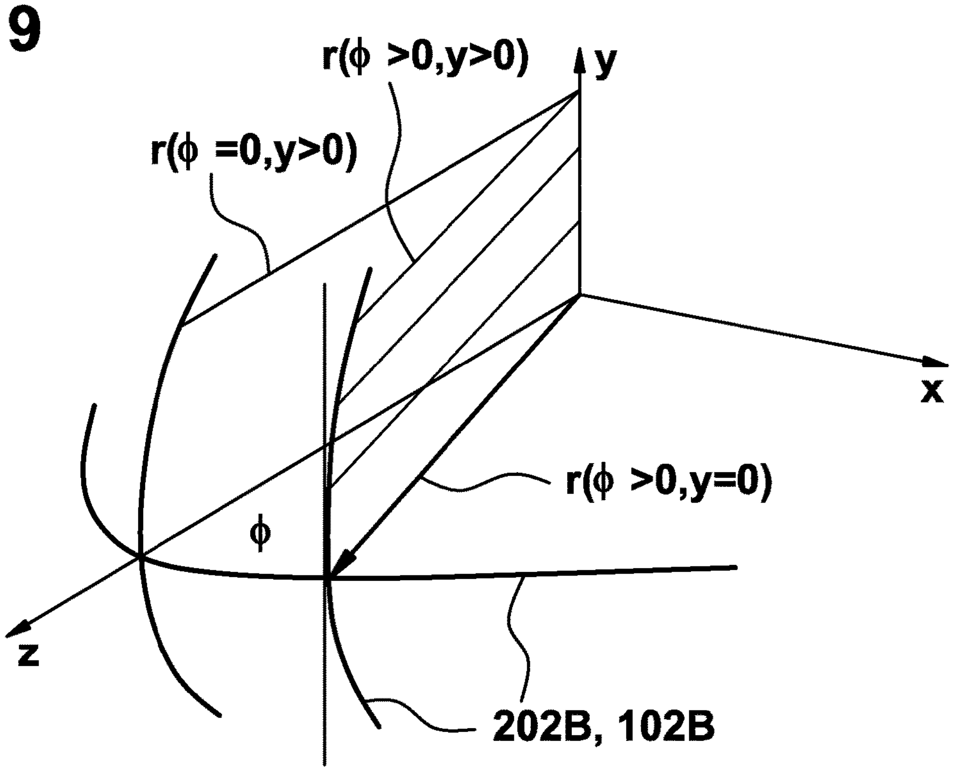
FIG. 9 shows an embodiment example for explaining (the parameters of) the function (distance function, distance function from the y-coordinate/y-axis) of an optically effective light exit surface of the headlight lens according to FIG. 3.

On its side facing away from the light entrance surface 101, the light tunnel 108 transitions with a bend 107, shown enlarged in FIG. 4, into a light conducting part 109 (of the press-molded one-piece body) having a segmented light exit surface 102, the segments of which are designated by reference signs 102A, 102B, 102C and explained with reference to FIG. 8 and FIG. 9. Reference numeral 110 denotes a Petzval surface of the light conducting part 109 facing the light tunnel. The headlight lens 100 is configured such that light entering the headlight lens 100 through the light entrance surface 101 and entering the light conducting part 109 in the region of the bend 107 from the light tunnel 108 exits essentially parallel to the optical axis of the headlight lens 100 from the light exit surface 102. Light, which is irradiated by means of the LEDs 11 (arranged on a carrier 11A) into the light entrance surfaces 101" and 101' of the left-hand segments 108A" and 108A (when properly aligned) of the light tunnel 108 by means of the light source 11, emerges predominantly or essentially from the segments

102B and 102A of the light exit surface 102. Light irradiated by means of the LEDs 11 into the light entrance surfaces 101" and 101" of the right-hand segments 108A" and 108A" (when properly aligned) of the light tunnel 108 by means of the LEDs 11 emerges predominantly or essentially from the segments 102C and 102A of the light exit surface 102. Light irradiated into the light entrance surface 101' of the central segment 108A of the light tunnel 108 by means of the LEDs 11 emerges predominantly or essentially from the segment 102A of the light exit surface 102.

The bend 107 is formed by press-molding and is designed as a continuously curved transition. The light conducting part 109 (or the light exit surface 102) images the bend 107 as a bright dark boundary, with light being radiated or coupled into the light entrance surface 101 of the light tunnel 108 by means of a light source assembly arranged on a carrier 11A and designed as a plurality of LEDs 11 for implementation of a low beam. The light tunnel 108 has a transition region 108B in which the surface bounding the light tunnel 108 upwardly rises toward the light conducting part 109, and in which the surface bounding the light tunnel 108 downwardly is approximately horizontal or parallel to the optical axis of the headlight lens 100. The motor vehicle headlight 10 may be supplemented by further light sources as disclosed in WO 2012/072188 A1 and WO 2012/072192 A1. For example, by means of a light source 12 that can optionally be switched in to implement a signal light or a high beam light, corresponding to the light source 12 disclosed in WO 2012/072188 A1, light can be coupled or irradiated into an underside of the light tunnel 108 and/or into the surface of the light conducting part 109 facing the light tunnel 108.

Figure 7:
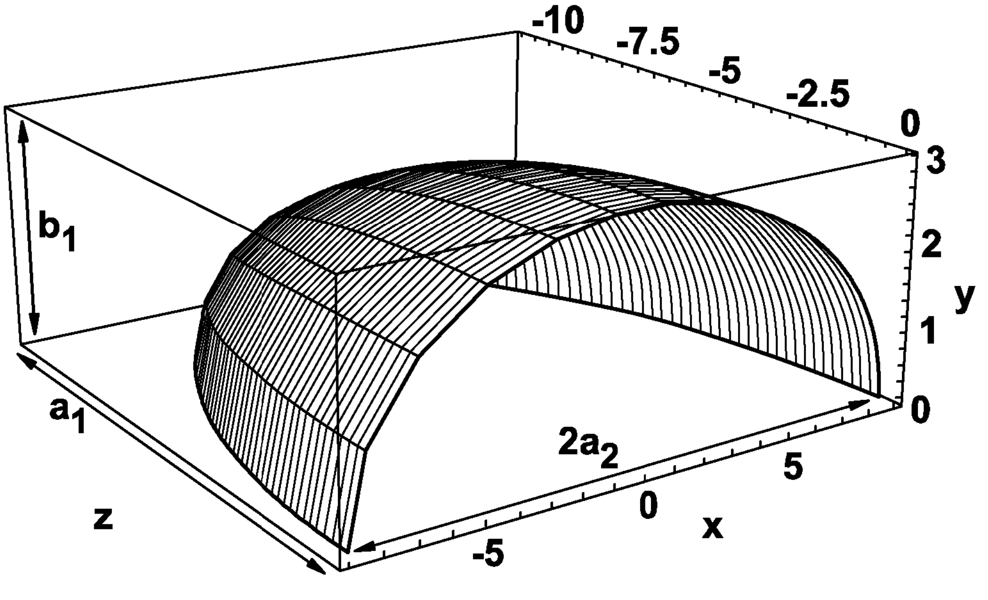
FIG. 7 shows a flattened ellipsoid according to whose upper part the upward bounding surface of the light tunnel of the headlight lens according to FIG. 3 is designed.

FIG. 7 shows an embodiment of a flattened ellipsoid $$E(x,z;y)=E_{a_1,b_1}(z;y)\times E_{a_2,b_2}(x;y)$$

where $$E_{a_1,b_1}(z;y)$$

and $$E_{a_2,b_2}(x;y)$$

are two crossed ellipses (Here the cross "x" means that in x-direction and in y-direction is operated separately and the representation of the ellipsoid decomposes into that of two planar ellipses), where z is a coordinate in the direction of the optical axis of the light tunnel and/or in the longitudinal direction of the light tunnel, where y is a coordinate in the vertical direction, where x is a (horizontal) coordinate orthogonal to the y-direction and orthogonal to the z-direction, and where holds $$E_{a_1,b_1}(z;y):\ \frac{z^2}{a_1^2}+\frac{y^2}{b_1^2}=1$$

$$E_{a_2,b_2}(x;y):\ \frac{x^2}{a_2^2}+\frac{y^2}{b_2^2}=1$$

Thereby is $1.9\cdot b_1 \le a_2$ and $1.9\cdot b_1 \le a_2$ and/or $3\cdot b_1 \le a_2$ and/or $0<a_1/a_2\le 1.5$ or $0\le a_1/a_2\le 1.5$ and/or $a_2<20\cdot b_1$ and/or $a_2\le 50\cdot b_1$.

The disclosure thus permits the production of a particularly low-cost headlight for motor vehicles with a high quality of illumination.

Figure 10:
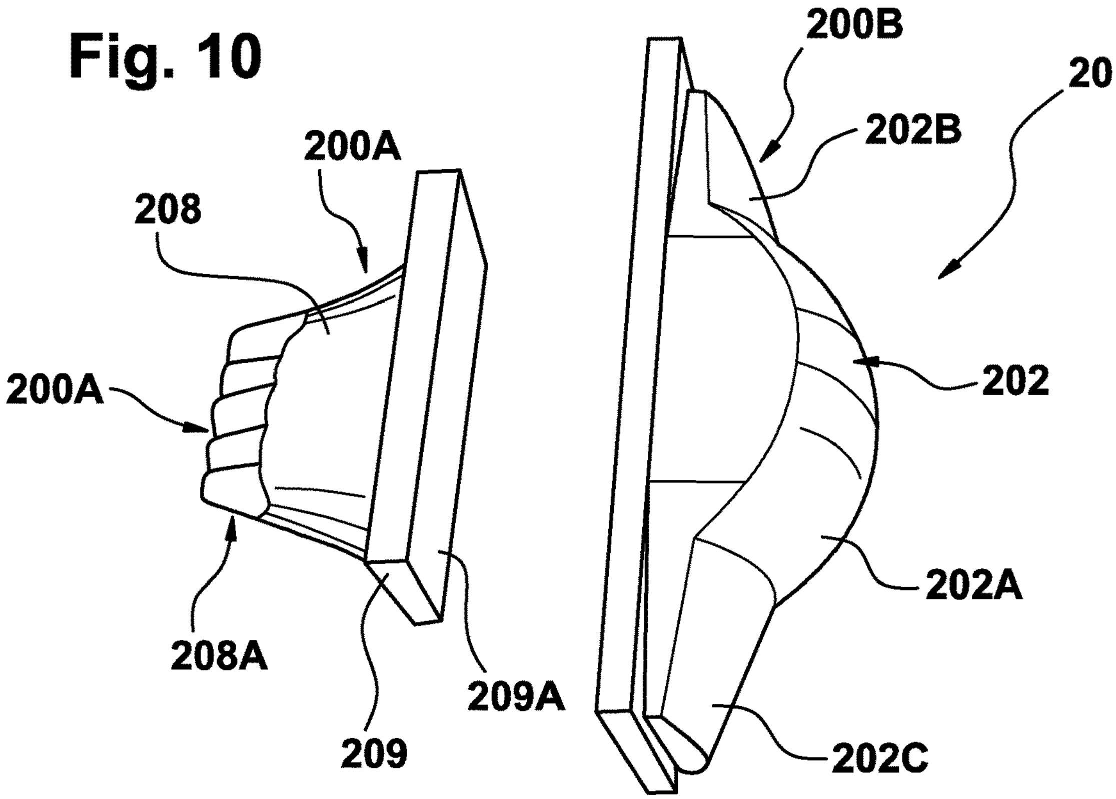
FIG. 10 shows an embodiment example for a vehicle headlight (without light source, housing, etc.) for alternative use instead of the vehicle headlight according to FIG. 3 in a perspective view, wherein the vehicle headlight comprises a primary optics and a secondary optics arranged downstream of the primary optics (in the light path)
Figure 11:
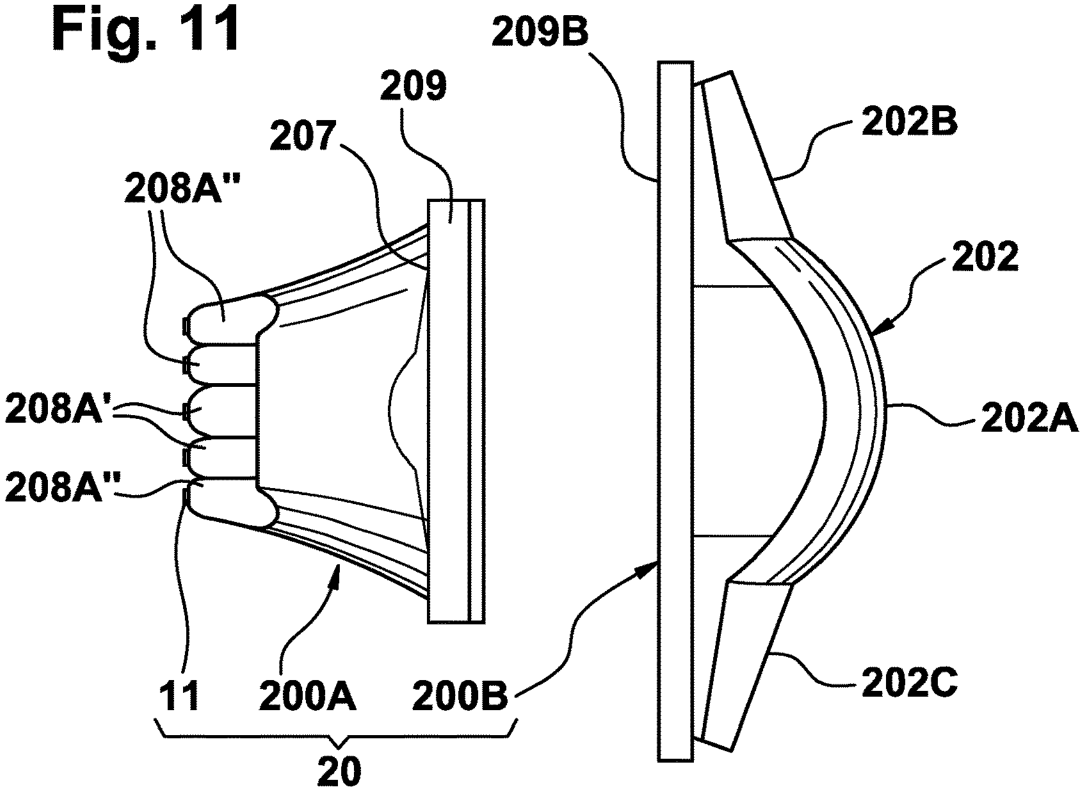
FIG. 11 shows the vehicle headlight according to FIG. 10 in a view from below.
Figure 13:
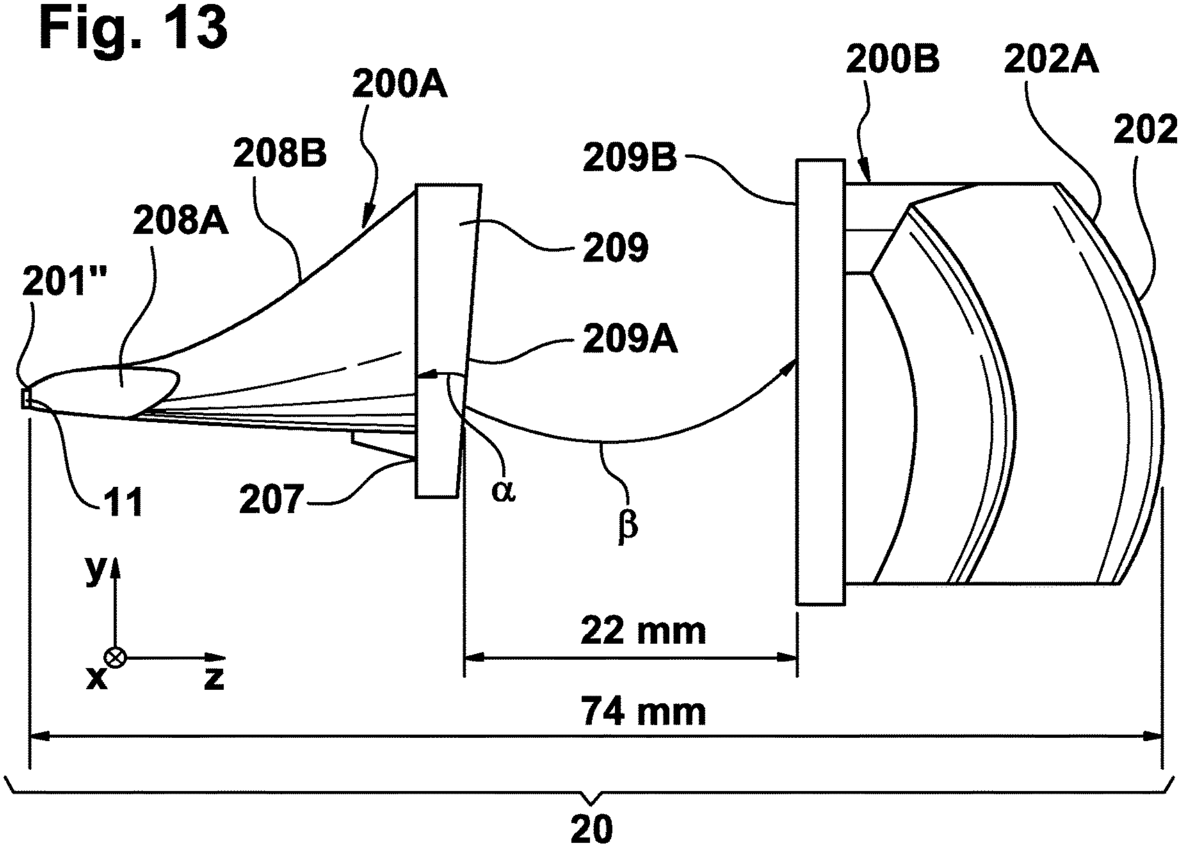
FIG. 13 shows the vehicle headlight according to FIG. 10 in a side view.

FIG. 10 shows a vehicle headlight 20, for example a motor vehicle headlight. FIG. 11 shows the vehicle headlight 20 in a view from below, and FIG. 13 shows the vehicle headlight 20 in a side view. The vehicle headlight 20 comprises a primary optics 200A having a body, for example a press-molded body, for example a one-piece body, made of inorganic glass, for example glass, which 0.2 to 2 wt.-% $Al_2O_3$,
0.1 to 1 wt.-% $Li_2O$,
0.3, for example 0.4, to 1.5 wt.-% $Sb_2O_3$,
60 to 75 wt.-% $SiO_2$,
3 to 12 wt.-% $Na_2O$,
3 to 12 wt.-% $K_2O$ and
3 to 12 wt.-% CaO, comprises.

The, for example one-piece, body of the primary optics 200A comprises at least one light tunnel 208 and a wedge-shaped light conducting part 209 with at least one, for example optically effective, light exit surface 209A, wherein the light tunnel 208 comprises at least one, for example optically effective, light entrance surface 201 and transitions with a bend 207 into the light conducting part 209. The bend 207 is formed (by press-molding) and is configured as a continuous and/or curved transition.

Figure 12:
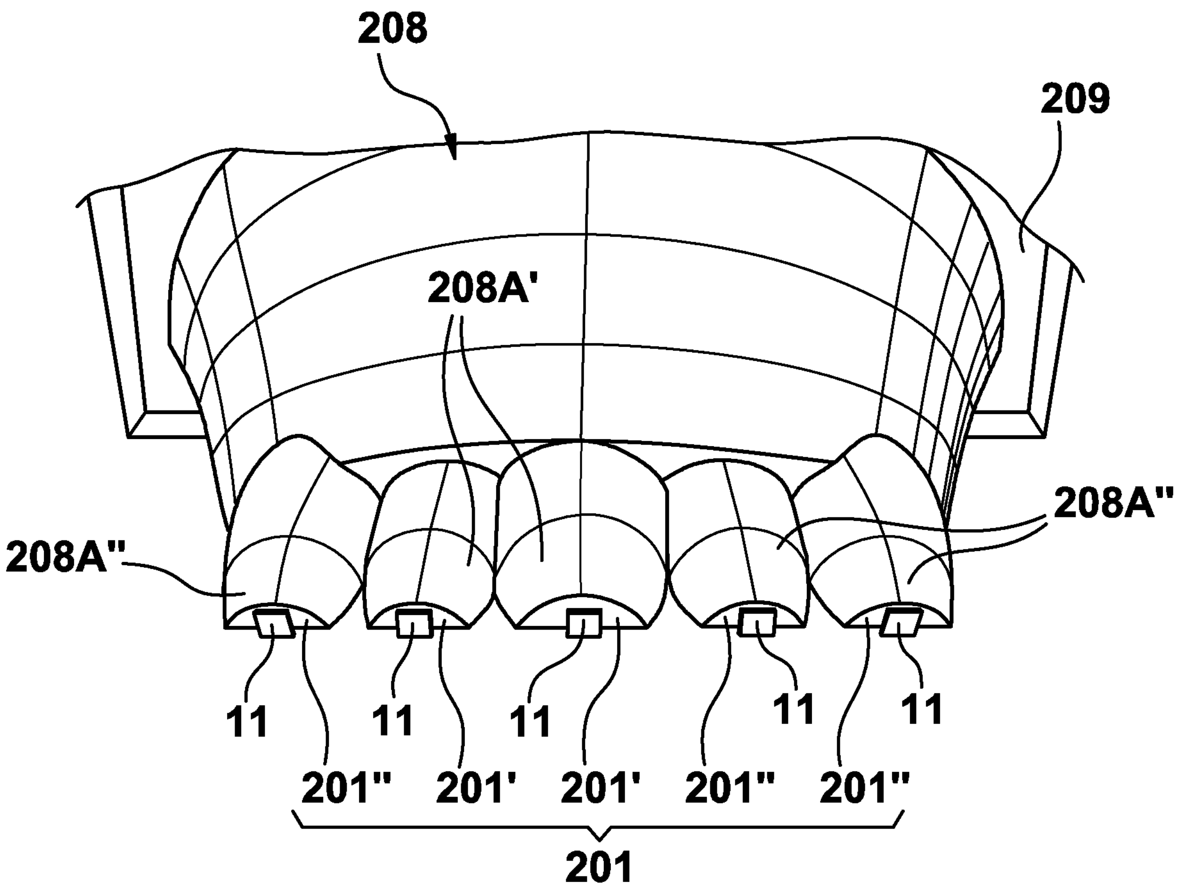
FIG. 12 shows a sectional view of the light tunnel of the primary optics according to FIG. 10.

As shown in FIG. 5 and FIG. 12, the front portion 208A of the light tunnel 208 is segmented on its upwardly bounded surface, with the segment surfaces following either flattened ellipsoids (segment 208A") or rotationally symmetric ellipsoids (segment 208A). The light tunnel 208 comprises a front portion 208A configured to correspond to the front portion 108A of the light tunnel 108 (see FIG. 5 and FIG. 12). Accordingly, the front portion 208A of the light tunnel 208 (for example with respect to the portion corresponding to a flattened ellipsoid) is configured as described with respect to FIG. 7.

The vehicle headlight 20 comprises a secondary optics 200B, for example made of plastic, for example made of PMMA, with an optically effective light exit surface 202 for imaging the light exit surface 209A of the light conducting part 209 or the bend 207. The light exit surface 202 is segmented, as shown for example in FIG. 8, the segments thereof being designated by reference signs 202A, 202B, 202C. Light irradiated by means of the LEDs 11 into the light entrance surfaces 201" and 201' of the left segments 208A" and 208A' (when properly aligned) of the light tunnel 208 by means of the light source 11 emerges predominantly or essentially from the segments 202B and 202A of the light exit surface 202. Light irradiated by means of the LEDs 11 into the light entrance surfaces 201" and 201" of the right-hand segments 208A" and 208A" (when properly aligned) of the light tunnel 208 by means of the LEDs 11 emerges predominantly or essentially from the segments 202C and 202A of the light exit surface 202. Light irradiated into the light entrance surface 201' of the central segment 208A of the light tunnel 208 by means of the LEDs 11 emerges predominantly or essentially from the segment 202A of the light exit surface 202.

The light exit surfaces (surfaces) of segments 102B and 102C or 202B and 202C are defined or characterized as follows, compare FIG. 9:

$$r(\Phi,y)=f(\Phi)-\frac{f(\Phi)(n-1)n-\sqrt{n^2(n-1)\left(f(\Phi)^2(n-1)-(n+1)y^2\right)}}{n^2-1}$$

Where n is the refractive index of the inorganic glass. f(ϕ) is defined as r(ϕ,y=0). The shape of the light exit surfaces or the surfaces of segments 102B and 102C or 202B and 202C further illustrates FIG. 9, where the source is located at the origin (0,0,0). Thereby:

$$r(\phi, y=0) = \frac{N}{Y(\phi-\phi_0)^X + \cos(\phi) + m\cdot\sin(\phi)}$$

$\phi_0$ describes the value at which the segments intersect. In the present embodiment, it is approximately 9° to 11°. The following also applies:

N □[55 mm,65 mm]

m □[0.2,0.3]

X □[1.0,4.0]

Y □[0,1]

The following values are provided in the present embodiment example:

N=62.2553 mm m=0.284369

X=1.5

Y=0.3

As shown in FIG. 13, the light conducting part 209 is wedge-shaped with a downwardly directed blunt end. The wedge-shaped light conducting part 209 tapers with a wedge angle α from the top in the downward direction, resulting in an inclined light exit surface 209A of the light conducting part 209. The primary optics 200A and secondary optics 200B are aligned with each other such that the light entrance surface 209B of the secondary optics 200B is tilted at a tilt angle β with respect to the light exit surface 209A of the primary optics 209 such that the wedge angle α is approximately equal to the tilt angle R. For example, it is provided that the secondary optics 200B is configured and arranged or aligned with respect to the primary optics 200A such that the light exit surface 202 of the secondary optics 200B images the light exit surface 209A of the primary optics 200A or the bend 207.

With the exception of the illustration of the headlight or vehicle headlight 20 in FIG. 13, the other figures depicting vehicle headlights or parts of vehicle headlights (with the exception of the illustration of the flattened ellipsoid shown in FIG. 7) are not drawn to scale.

Figure 14:
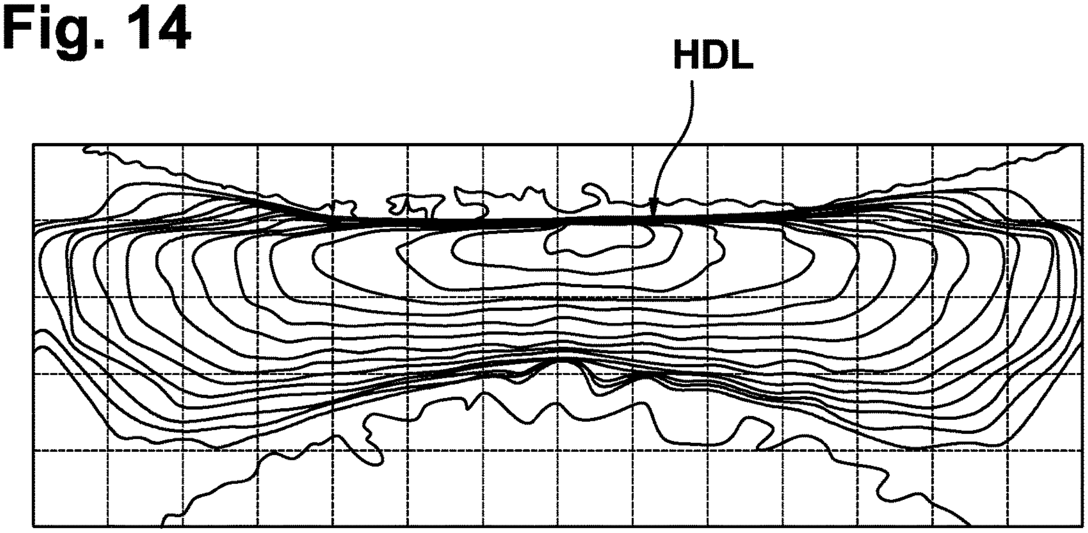
FIG. 14 shows a light distribution generated by means of the vehicle headlight according to FIG. 10.

FIG. 14 shows a light distribution generated by means of the vehicle headlight 20. The disclosed vehicle headlight makes it possible in a particularly suitable manner to push the illumination below the bright dark boundary, increasing the horizontal illumination and reducing the vertical illumination. In addition, light is concentrated in the area of the bright dark boundary.

The disclosure specifies for example an improved headlight lens for a vehicle headlight, for example for a motor vehicle headlight. It is further an object of the disclosure to provide a correspondingly improved vehicle headlight or motor vehicle. It is further provided an improved vehicle headlight. Improved in this sense means, for example, an improved light distribution. For example, it is desirable that as little light as possible is emitted above a bright dark boundary. In addition, it is for example desirable that a light distribution in the horizontal direction is as extensive as possible, whereas the light distribution in the vertical direction should be as little extensive as possible. In addition, it is desirable to achieve a light intensity that is particularly high at the lower edge of the bright dark boundary.

The invention claimed is:

1. A vehicle headlight comprising:

a light source assembly;

a primary optics, the primary optics comprising at least one light tunnel and a wedge-shaped light conducting part with at least one optically effective light exit surface, wherein the light tunnel comprises at least one light entrance surface, into which light generated by means of the light source assembly can be irradiated, wherein the light tunnel transitions with a bend into the light conducting part, wherein the bend is a transition portion between the light tunnel and the light conducting part that is curved with a radius of curvature of not less than 50 nm and is located in lower region of the light tunnel; and a secondary optics with an optically effective light exit surface configured for imaging the bend, wherein the secondary optics comprises an essentially flat light entrance surface, which is tilted by a tilt angle (β) with respect to the light exit surface of the primary optics.

2. The vehicle headlight according to claim 1, wherein the wedge-shaped light conducting part comprises a wedge angle, and wherein the wedge angle and the tilt angle (β) are essentially equal.

3. The vehicle headlight of claim 2, wherein the wedge-shaped light conducting part tapers from the top in the downward direction.

4. The vehicle headlight of claim 3, wherein the light exit surface of the primary optics is tilted with respect to a first imaginary plane by the tilt angle (β), the first imaginary plane having a normal in a direction of an optical axis of the primary optics.

5. The vehicle headlight of claim 3, wherein the light exit surface of the primary optics is planar and tilted with respect to a first imaginary plane by the tilt angle (β), the first imaginary plane having a normal in a direction of an optical axis of the light exit surface of the secondary optics.

6. The vehicle headlight of claim 3, wherein the light tunnel comprises a front portion segmented on its upwardly bounded surface, wherein a first segment of the segmented portion is part of at least a first ellipsoid, wherein a second segment of the segmented portion is part of at least a second ellipsoid, wherein a semi-axis ratio of the second ellipsoid differs from a semi-axis ratio of the first ellipsoid, wherein the semi-axis ratio is the ratio of the largest semi-axis of the ellipsoid to its smallest semi-axis.

7. The vehicle headlight of claim 2, wherein the light exit surface of the secondary optics comprises at least three segments including a central segment, wherein a segment is separated from another segment by an indentation, wherein the light exit surface of the primary optics is tilted with respect to a first imaginary plane by the tilt angle (β), the first imaginary plane having a normal in a direction of an optical axis of the central segment.

8. The vehicle headlight of claim 2, wherein the light exit surface of the primary optics is planar and tilted with respect to a first imaginary plane by the tilt angle (β), the first imaginary plane having a normal in a direction of an optical axis of the secondary optics.

9. The vehicle headlight of claim 2, wherein the light tunnel comprises a front portion segmented on its upwardly bounded surface, wherein a first segment of the segmented portion is part of at least a first ellipsoid, wherein a second segment of the segmented portion is part of at least a second ellipsoid, wherein a semi-axis ratio of the second ellipsoid differs from a semi-axis ratio of the first ellipsoid, wherein the semi-axis ratio is the ratio of the largest semi-axis of the ellipsoid to its smallest semi-axis.

10. The vehicle headlight of claim 1, wherein the light exit surface of the secondary optics comprises at least three segments including a central segment, wherein the light exit surface of the primary optics is tilted with respect to a first imaginary plane by the tilt angle (β), the first imaginary plane having a normal in a direction of an optical axis of the central segment.

11. The vehicle headlight of claim 1, wherein the light exit surface of the primary optics is tilted with respect to a first imaginary plane by the tilt angle (β), the first imaginary plane having a normal in a z-direction, wherein the z-direction is in the direction of at least one of an optical axis of the primary optics, an optical axis of the secondary optics and an optical axis of the light exit surface of the secondary optics.

12. The vehicle headlight of claim 1, wherein the light exit surface of the primary optics is planar and tilted with respect to a first imaginary plane by the tilt angle (β), the first imaginary plane having a normal in a direction of an optical axis of the of the secondary optics.

13. The vehicle headlight of claim 1, wherein the light tunnel comprises a front portion segmented on its upwardly bounded surface, wherein a first segment of the segmented portion is part of at least a first ellipsoid, wherein a second segment of the segmented portion is part of at least a second ellipsoid, wherein a semi-axis ratio of the second ellipsoid differs from a semi-axis ratio of the first ellipsoid, wherein the semi-axis ratio is the ratio of the largest semi-axis of the ellipsoid to its smallest semi-axis.

14. Vehicle headlight comprising:

a light source assembly;

primary optics comprising at least one light tunnel comprising a surface at which total reflection occurs and a light conducting part with at least one light exit surface, wherein the light tunnel comprises at least one light entrance surface, into which light generated by means of the light source assembly can be irradiated, wherein the light tunnel transitions with a bend into the light conducting part, wherein the bend is a transition portion between the light tunnel and the light conducting part that is curved with a radius of curvature of not less than 50 nm and is located in lower region of the light tunnel, a secondary optics with an optically effective light exit surface for imaging a light exit surface of the primary optics, the secondary optics further comprising at least a planar light entrance surface, which is tilted by a tilt angle (β) with respect to the light exit surface of the primary optics, wherein the tilt angle (β) is more than 2° and not more than 7°.

15. The vehicle headlight of claim 14, wherein the wedge-shaped light conducting part tapers from the top in the downward direction.

16. The vehicle headlight of claim 15, wherein the light tunnel comprises a front portion segmented on its upwardly bounded surface, wherein a first segment of the segmented portion is part of at least a first ellipsoid, wherein a second segment of the segmented portion is part of at least a second ellipsoid, wherein a semi-axis ratio of the second ellipsoid differs from a semi-axis ratio of the first ellipsoid, wherein the semi-axis ratio is the ratio of the largest semi-axis of the ellipsoid to its smallest semi-axis.

17. The vehicle headlight of claim 14, wherein the light exit surface of the secondary optics comprises at least three segments including a central segment, wherein the light exit surface of the primary optics is tilted with respect to a first imaginary plane by the tilt angle (β), the first imaginary plane having a normal in a direction of an optical axis of the central segment.

18. The vehicle headlight of claim 14, wherein the light exit surface of the primary optics is tilted with respect to a first imaginary plane by the tilt angle (β), the first imaginary plane having a normal in a direction of an optical axis of the primary optics.

19. The vehicle headlight of claim 14, wherein the light exit surface of the primary optics is planar and tilted with respect to a first imaginary plane by the tilt angle (β), the first imaginary plane having a normal in a direction of an optical axis of the of the secondary optics.

20. The vehicle headlight of claim 14, wherein the light exit surface of the primary optics is tilted with respect to a first imaginary plane by the tilt angle (β), the first imaginary plane having a normal in a direction of an optical axis of the light exit surface of the secondary optics.

21. The vehicle headlight of claim 14, wherein the light tunnel comprises a front portion segmented on its upwardly bounded surface, wherein a first segment of the segmented portion is part of at least a first ellipsoid, wherein a second segment of the segmented portion is part of at least a second ellipsoid, wherein a semi-axis ratio of the second ellipsoid differs from a semi-axis ratio of the first ellipsoid, wherein the semi-axis ratio is the ratio of the largest semi-axis of the ellipsoid to its smallest semi-axis.

22. A vehicle headlight comprising:

a light source assembly;

a primary optics, the primary optics comprising at least one light tunnel and a wedge-shaped light conducting part with at least one optically effective light exit surface, wherein the light tunnel comprises at least one light entrance surface, into which light generated by means of the light source assembly can be irradiated, wherein the light tunnel transitions with a bend into the light conducting part, wherein the wedge-shaped light conducting part tapers from the top in the downward direction, wherein the bend is a transition portion between the light tunnel and the light conducting part that is curved with a radius of curvature of not less than 50 nm and is located in lower region of the light tunnel; and a secondary optics configured for imaging the bend as a bright dark boundary.

23. The vehicle headlight of claim 22, wherein the light tunnel comprises a front portion segmented on its upwardly bounded surface, wherein a first segment of the segmented portion is part of at least a first ellipsoid, wherein a second segment of the segmented portion is part of at least a second ellipsoid, wherein a semi-axis ratio of the second ellipsoid differs from a semi-axis ratio of the first ellipsoid, wherein the semi-axis ratio is the ratio of the largest semi-axis of the ellipsoid to its smallest semi-axis.

* * * * *